(12) United States Patent
Brustoloni et al.

(10) Patent No.: US 6,625,149 B1
(45) Date of Patent: Sep. 23, 2003

(54) SIGNALED RECEIVER PROCESSING METHODS AND APPARATUS FOR IMPROVED PROTOCOL PROCESSING

(75) Inventors: José Carlos Brustoloni, Chatham, NJ (US); Eran Gabber, Summit, NJ (US); Abraham Silberschatz, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/450,034

(22) Filed: Nov. 29, 1999

(51) Int. Cl.⁷ .............................................. H04L 12/56
(52) U.S. Cl. ...................................... 370/389; 370/469
(58) Field of Search ................................ 370/389, 392, 370/465, 469; 709/230, 250

(56) References Cited

U.S. PATENT DOCUMENTS

| | | | | |
|---|---|---|---|---|
| 5,020,020 A | * | 5/1991 | Pomfret et al. | 709/235 |
| 5,193,149 A | * | 3/1993 | Awiszio et al. | 709/250 |
| 5,381,413 A | * | 1/1995 | Tobagi et al. | 370/448 |

OTHER PUBLICATIONS

I. Stoica et al., "A Proportional Share Resource Allocation Algorithm for Real–Time, Time–Shared Systems," in Proceedings of Real Time Systems Symp., IEEE, pp. 1–12, Dec. 1996.

D. Stiliadis et al., "Frame–Based Fair Queuing: A New Traffic Scheduling Algorithm for Packet–Switched Networks," Tech. Rep. UCSC–CRL–95–39, Univ. Calif. Santa Cruz, pp. 1–41, Jul. 1995.

J. Mogul et al., "Eliminating Receive Livelock in an Interrupt–driven Kernel," in Proceedings of Annual Tech. Conf., USENIX, pp. i–viii and 1–46, 1996.

J. Bruno et al., "The Eclipse Operating System: Providing Quality of Service via Reservation Domains," in Proceedings of Annual Tech. Conf., USENIX, pp. 235–246, Jun. 1998.

J. Bennet et al., "WF²Q: Worst–Case Fair Weighted Fair Queueing," in Proceedings of INFOCOM'96, IEEE, pp. 120–128, Mar. 1996.

J. Bennet et al., "Hierarchical Packet Fair Queueing Algorithms," in Proceedings of SIGCOMM'96, ACM, 7 pages, Aug. 1996.

(List continued on next page.)

*Primary Examiner*—Kwang Bin Yao

(57) ABSTRACT

Received packets are processed utilizing protocol processing stages in an operating system, in accordance with a technique referred to as signaled receiver processing (SRP). A given protocol processing stage uses a next stage submit (NSS) function to pass a packet to a subsequent protocol processing stage. Each protocol processing stage is associated with one or more sockets. Each socket is associated with the input function of a protocol processing stage, an unprocessed input queue (UIQ) that contains packets destined to the socket but not yet processed by the socket's input function, and a list of owner processes, which expect input from the socket. NSS uses a multi-stage early demultiplexing (MED) function, which determines a packet's next destination socket, based on the stage currently processing the packet and on information contained in the packet. If the amount of buffering used by a packet plus the amount of input buffering already used by the packet's destination socket exceeds a designated limit associated with that socket, NSS drops the packet. Otherwise, NSS enqueues the packet in that socket's UIQ and signals that socket's owner processes. The signal triggers a default action corresponding to performance of the required protocol processing by one of the destination socket's owner processes, but those processes may override the default action by, e.g., deferring the required protocol processing until execution of a subsequent receive call.

17 Claims, 6 Drawing Sheets

OTHER PUBLICATIONS

P. Goyal et al., "A Hierarchical CPU Scheduler for Multimedia Operating Systems," in Proceedings of OSDI'96, USENIX, pp. 107–121, Oct. 1996.

J. Bruno, et al., "Disk Scheduling with Quality of Service Guarantees," in Proceedings of ICMCS'99, IEEE, 3 pages Jun. 1999.

P. Druschel et al., "Lazy Receiver Processing (LRP): A Network Subsystem Architecture for Server Systems," in Proceedings of OSDI'96, USENIX, pp. 261–275, Oct. 1996.

D. Ghormley et al., "SLIC: An Extensibility System for Commodity Operating Systems," in Proceedings of Annual Tech. Conf., USENIX, 15 pages, Jun. 1998.

P. Goyal et al., "Start–Time Fair Queuing: A Scheduling Algorithm for Integrated Services Packet Switching Networks," in Proceedings of SIGCOMM'96, ACM, pp. 1–14, Aug. 1996.

M. Jones et al., "CPU Reservations and Time Constraints: Efficient, Predictable Scheduling of Independent Activities," in Proceedings of SOSP'97, ACM, pp. 198–211, Oct. 1997.

J. Nieh, "The Design, Implementation and Evaluation of SMART: A Scheduler for Multimedia Applications," in Proceedings of SOSP'97, ACM, pp. 184–197, Oct. 1997.

P. J. Shenoy et al., "Cello: A Disk Scheduling Framework for Next Generation Operating Systems," in Proceedings of SIGMETRICS'98, ACM, 6 pages, Jun. 1998.

G. Banga et al., "Resource Containers: A New Facility for Resource Management in Server Systems," in Proceedings of OSDI'99, USENIX, pp. 45–58, Feb. 1999.

B.D. Noble et al., "Agile Application–Aware Adaptation for Mobility," in Proceedings of SOSP'97, ACM, 6 pages, 1997.

G. Banga et al., "Better Operating System Features for Faster Network Servers," in Proceedings of Workshop on Internet Server Performance, 6 pages, Jun. 1998.

* cited by examiner

| APPLICATION | ELAPSED TIME (ms) WITH SIGUIQ | | | | IMPROVEMENT % |
|---|---|---|---|---|---|
| | DEFAULT | | IGNORED | | |
| | AVE | STD DEV | AVE | STD DEV | |
| AVERAGES | 63.1 | 0.8 | 54.8 | 0.2 | 13.1 |
| INTERNAL PRODUCTS | 50.7 | 0.2 | 46.5 | 0.4 | 8.3 |
| SELECT nTH | 61.0 | 0.3 | 55.7 | 0.2 | 8.6 |

SIGNALED RECEIVER PROCESSING METHODS AND APPARATUS FOR IMPROVED PROTOCOL PROCESSING

FIELD OF THE INVENTION

The present invention relates generally to computer systems, and more particularly to techniques for implementing communication protocols in operating systems.

BACKGROUND OF THE INVENTION

FIG. 1 illustrates how a FreeBSD operating system processes Internet protocol (IP) packets received from an Ethernet network. This protocol processing organization is referred to as the "BSD approach" because it is derived from that used in the Berkeley Software Distribution (BSD) Unix operating system. With minor variations, the organization shown in FIG. 1 is found in many other operating systems, including cases of protocol families other than IP and networks other than Ethernet.

In the BSD approach, incoming packets are processed at software interrupt level, at a priority higher than that of any application. Input protocol processing is not scheduled and is charged to the interrupted application, even if that application is unrelated to the received packets. This leads to two undesirable consequences. First, high receive loads, e.g., due to a server "hot spot" or a denial-of-service attack, can make the system unable to process any application. This is the so-called "receive livelock" problem as described in, e.g., J. Mogul and K. K. Ramakrishnan, "Eliminating receive livelock in an interrupt-driven kernel," Proceedings of Annual Tech. Conf., USENIX, 1996. Second, because protocol processing of received packets is unscheduled, the system cannot enforce CPU allocations and thus cannot provide quality of service (QoS) guarantees to applications.

As shown in FIG. 1, in FreeBSD, arrival of an IP packet causes a hardware interrupt that transfers central processing unit (CPU) control to a network interface driver 10. The driver 10 retrieves the packet from the corresponding network interface hardware, prepares the hardware for receiving a future packet, and passes the received packet to an ether_input routine 12. The ether_input routine 12 places the packet in an IP input queue 14 without demultiplexing, i.e., all IP packets go into the same input queue 14. The ether_input routine 12 then issues a network software interrupt. This software interrupt has a priority higher than that of any application, but lower than that of the hardware interrupt.

FreeBSD handles the network software interrupt by dequeuing each packet from the IP input queue 14 and calling an ip_input routine 15. The ip_input routine 15 performs a checksum on the packet's IP header and submits the packet to preliminary processing operations such as, e.g., firewalling 16 and/or network address translation (NAT) 18, if configured in the system, and IP options 20, if present in the packet header. This preliminary processing may drop, modify, or forward the packet.

The ip_input routine 15 then checks the packet's destination IP address. If that address is the same as one of the host's addresses, the ip_input routine 15 jumps to its ip_input_ours label 21, reassembles the packet, and passes the packet to the input routine of the higher-layer protocol selected in the packet header, e.g., transmission control protocol (TCP) input routine 22-1, user datagram protocol (UDP) input routine 22-2, IP in IP tunneling (IPIP) input routine 22-4, resource reservation protocol (RSVP) input routine 22-5, Internet group management protocol (IGMP) input routine 22-6, Internet control message protocol (ICMP) input routine 22-7, or, for other protocols implemented by a user-level application, raw IP (RIP) input routine 22-3. Otherwise, if the destination is a multicast address, the ip_input routine 15 submits the packet to a higher-layer protocol, for local delivery, and to the ip_mforward routine 24, if the system is configured as a multicast router. Finally, if the destination IP address matches neither one of the host's addresses nor a multicast address, and the system is configured as a gateway, the ip_input routine 15 submits the packet to the ip_forward routine 26; otherwise, the ip_input routine 15 drops the packet. The ip_mforward routine 24, ip_forward routine 26, and one or more of the routines 22-1 may make use of the ip_output routine 27.

The TCP and UDP input routines 22-1 and 22-2, respectively, checksum the packet and then demultiplex it. These routines find the protocol control block (PCB) that corresponds to the destination port selected in the packet header, append the packet to the respective socket receive queue 28, and wake up receiving processes 29 that are waiting for that queue to be non-empty. However, if the socket receive queue 28 is full, FreeBSD drops the packet.

Protocol processing of a received packet in FreeBSD is asynchronous relative to the corresponding receiving processes 29. On a receive call, a receiving process 29 checks the socket receive queue 28. If the queue is empty, the receiving process sleeps; otherwise, the receiving process dequeues the data and copies it out to application buffers.

The BSD approach to protocol processing of received packets has two main disadvantages. First, it is prone to the above-mentioned problem of receive livelock. Because demultiplexing occurs so late, packets destined to the host are dropped only after protocol processing has already occurred. Applications only get a chance to run if the receive load is not so high that all CPU time is spent processing network hardware or software interrupts. Second, even at moderate receive loads, process scheduling may be affected by the fact that the CPU time spent processing network interrupts is charged to whatever process was interrupted, even if that process is unrelated to the received packets. Such incorrect accounting of CPU usage may prevent the operating system from enforcing CPU allocations, thus causing scheduling anomalies.

An alternative protocol processing organization, lazy receiver processing (LRP), is illustrated in FIGS. 2A and 2B. LRP is described in detail in P. Druschel and G. Banga, "Lazy receiver processing (LRP): a network subsystem architecture for server systems," Proceedings of OSDI'96, USENIX, 1996. Instead of the single IP input queue 14 of the above-described BSD approach, LRP uses separate packet queues referred to as channels, with one channel 30-i associated with each socket i. LRP employs early demultiplexing, that is, the network interface hardware, or the network interface driver 10 and the ether_input routine 12, examine the header of each packet and enqueue the packet directly in the channel that corresponds to the header, e.g., channel 30-1 in FIG. 2A or channel 30-2 in FIG. 2B. Following a hardware interrupt, LRP wakes up the processes that are waiting for the channel to be non-empty. However, if the given channel is full, the network interface drops the packet immediately, before further protocol processing.

The LRP approach handles TCP and UDP packets differently. In the UDP case, illustrated in FIG. 2B, the receiving process 32-2 performs the following loop while there is not enough data in the socket receive queue 34-2: While the corresponding channel 30-2 is empty, sleep; then dequeue each packet from the channel 30-2 and submit the packet to the ip_input routine 15, which calls the udp_input routine 22-2, which finally enqueues the packet in the socket receive queue 34-2. The receiving process 32-2 then dequeues the data from the socket receive queue 34-2 and copies it out to application buffers. Therefore, for UDP packets, LRP is synchronous relative to the receiving process's receive calls.

In the TCP case, illustrated in FIG. 2A, LRP is asynchronous relative to the receiving process 32-1. LRP cannot be synchronous relative to the receiving process 32-1 in the TCP case because (1) LRP was designed to be completely transparent to applications, and (2) in some applications, synchronous protocol processing could cause large or variable delays in TCP acknowledgements, adversely affecting throughput. In order to process TCP asynchronously without resorting to software interrupts, LRP associates with each process 32-1 an extra kernel thread 33 that is scheduled at the priority of process 32-1 and has its resource utilization charged to process 32-1. The kernel thread 33 continuously performs the following loop: While the process's TCP channels are empty, sleep; then dequeue each packet from a non-empty TCP channel, e.g., channel 30-1, and submit the packet to the ip_input routine 15, which calls the tcp_input routine 22-1, which finally enqueues the packet in the respective socket receive queue 34-1. LRP handles TCP receive calls similarly to FreeBSD: The receiving process simply checks the socket receive queue and, if the queue is empty, sleeps; otherwise, the process dequeues the data and copies it out to application buffers.

Although LRP, illustrated in FIGS. 2A and 2B, can provide advantages over FreeBSD's protocol processing organization, illustrated in FIG. 1, LRP has a number of significant drawbacks. For example, current versions of many operating systems, including FreeBSD, do not support kernel threads, which are necessary for LRP's TCP processing. Another serious drawback is that contemporary operating systems, including FreeBSD and Linux, often provide firewalling, NAT and other features that may drop packets or change packet headers, precluding LRP's early demultiplexing. A further difficulty of the LRP approach is that it requires all protocol processing to be scheduled, but the operating system's scheduling policies may not be appropriate for some of that processing. Most operating systems support time-sharing scheduling, which penalizes processes for their CPU consumption and may be appropriate for host protocol functionality, that is, for processing packets whose source or destination is an application running on the same node. On the other hand, few operating systems provide QoS guarantees, e.g., via proportional-share scheduling. Proportional-share scheduling can guarantee to each process at least a certain share of the CPU and may be desirable for gateway protocol functionality, such as firewalling, NAT, multicast, and IP forwarding, which process packets whose source and destination may both be on other nodes. Finally, LRP's policy of giving to each TCP kernel thread the same priority as the respective receiving application may be appropriate for time-sharing scheduling, but not for scheduling with QoS guarantees. In the latter case, each application may want to give to its protocol processing a certain fraction of the application's CPU allocation, or perhaps not be delayed by protocol processing while handling certain critical events. The LRP approach, due to its same-priority policy, is unable to provide this desirable flexibility.

SUMMARY OF THE INVENTION

The invention provides improved protocol processing techniques for use in operating systems. An illustrative embodiment of the invention, referred to herein as signaled receiver processing (SRP), overcomes the above-noted problems associated with the BSD and LRP approaches. In accordance with the invention, packet arrival causes a signal to the receiving process. The default action of this signal is to perform protocol processing. However, the receiving process can catch, block, or ignore the signal and defer protocol processing until a subsequent receive call. Therefore, in accordance with the invention, protocol processing is usually asynchronous with respect to application receive calls, but applications may opt for synchronous protocol processing. Applications may take advantage of the latter option, e.g., to control the fraction of the application's CPU allocation that is spent processing protocols, or to prevent interruptions while processing certain critical events.

In order to support firewalling, NAT, and other gateway protocol functionality, the invention organizes protocol processing in stages. In the illustrative embodiment, each stage invokes a next stage submit (NSS) function to pass a packet to the respective next protocol processing stage. NSS uses a multi-stage early demultiplexing (MED) function. In the illustrative embodiment, the only stage that runs at interrupt level is the one that inputs packets from the network interface hardware. An end-application stage processes IP, TCP, and UDP protocols for packets destined to the host, and runs in the context of the receiving application. Other stages (e.g., firewall, NAT, IP forwarding) run in the context of system processes with configurable minimum proportional CPU shares (in operating systems that can guarantee such CPU shares).

Because protocol processing, in accordance with the invention, occurs only when a process is scheduled, the invention prevents BSD's receive livelock problem described above. However, compared to LRP, the present invention has the advantage of being easily portable to systems that do not support kernel threads, such as FreeBSD. Additionally, the invention allows protocol processing to be always correctly charged, and consequently enables the system to enforce and honor proportional-share CPU allocations and other QoS guarantees. Furthermore, the invention does not require modifications to network interface hardware or drivers.

DETAILED DESCRIPTION OF THE INVENTION

The present invention will be illustrated below in conjunction with exemplary techniques for improved protocol processing in an operating system. It should be understood, however, that the invention is not limited to use with any particular type of computer system or computer system configuration, but is instead more generally applicable to any type or configuration of computer system in which it is desirable to provide improved protocol processing relative to the above-described BSD or LRP approaches. For example, although illustrated below in the context of BSD-based operating systems (FreeBSD and Eclipse/BSD), the techniques of the invention can also be applied to other types of operating systems, including other Unix-derived operating systems, as well as to non-Unix operating systems, such as Windows NT. Additional details regarding operating systems in which the invention may be implemented may be found in, e.g., M. McKusick et al., "The Design and Implementation of the 4.4 BSD Operating System," Addison Wesley Pub. Co., Reading, Mass., 1996, and H. Custer, "Inside Windows NT," Microsoft Press, 1993. In addition, although the invention is illustrated in the context of protocols such as TCP and IP, as described in greater detail in W. R. Stevens, "TCP/IP Illustrated," Vol. 1, Addison-Wesley Pub. Co., Reading, Mass., 1994, and on an Ethernet network, the invention is applicable to a wide variety of other types of protocols and networks.

The present invention provides improved protocol processing techniques for use in an operating system. An illustrative embodiment of the invention is a protocol processing technique referred to herein as signaled receiver processing (SRP). Advantageously, SRP does not require kernel threads, nor does it require modifications to the network interface hardware or driver.

Figure 3:
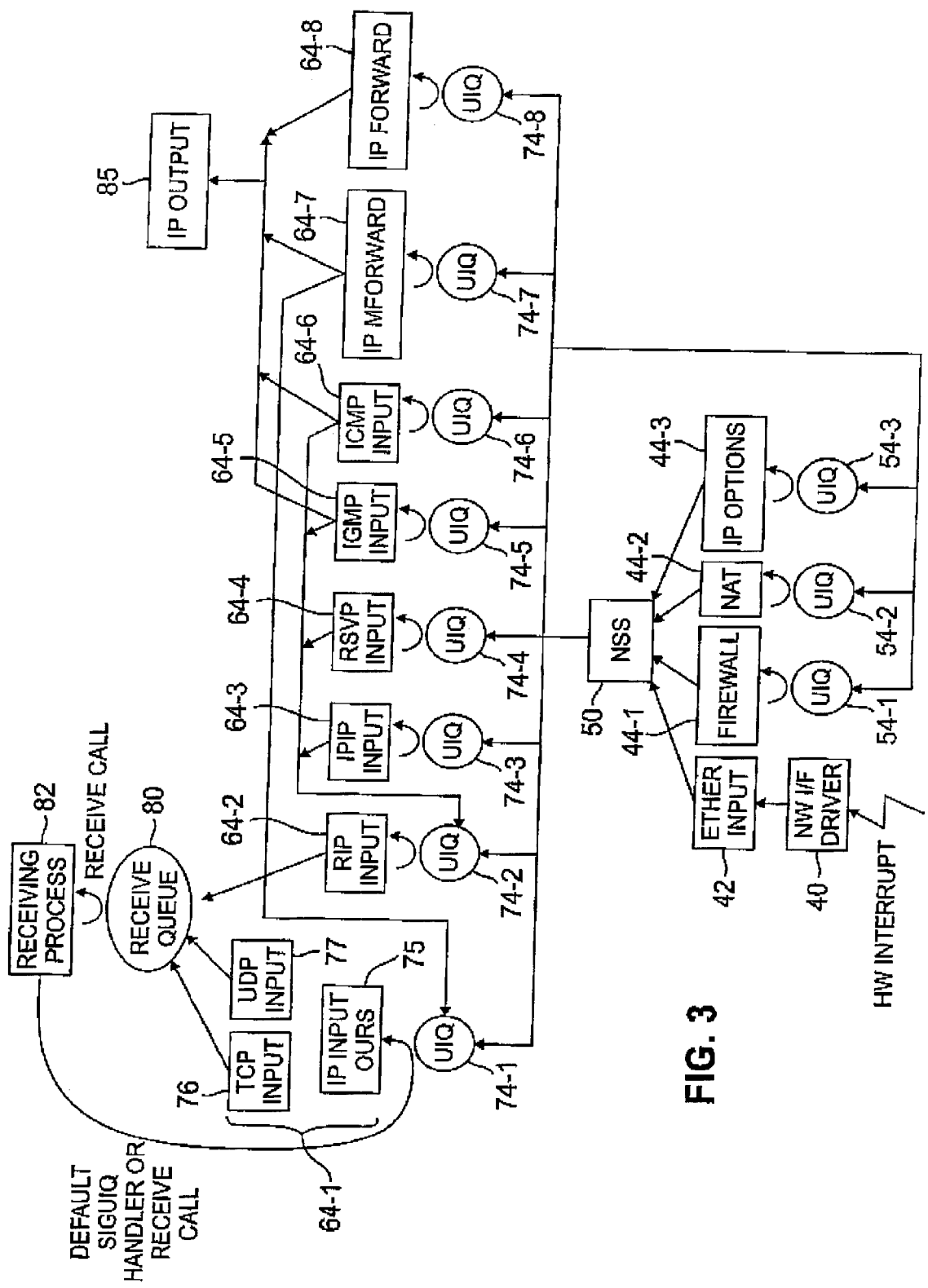
FIG. 3 illustrates protocol processing in an illustrative embodiment of the invention referred to herein as signaled receiver processing (SRP).

FIG. 3 illustrates the processing of an IP packet received from an Ethernet network, in accordance with SRP. A packet arrival causes a network hardware interrupt and transfers CPU control to the network interface driver 40, which passes the packet to an ether_input routine 42.

In order to accommodate preliminary protocol processing, such as firewalling and NAT, SRP organizes protocol processing in stages, where each stage comprises one or more protocol functions. A stage can be either preliminary or final. Preliminary stages are those that normally do not complete the processing of a received packet. Preliminary stages invoke a next stage submit (NSS) function 50 to submit a packet to the respective next stage. Preliminary stages in the FIG. 3 embodiment include ether_input 42, firewall 44-1, NAT 44-2, and IP options 44-3. In contrast, final stages are those that normally complete the protocol processing of a received packet. Final stages in the FIG. 3 embodiment include end-application 64-1, RIP input 64-2, IPIP input 64-3, RSVP input 64-4, IGMP input 64-5, ICMP input 64-6, ip_mforward 64-7, and ip_forward 64-8. The end-application stage 64-1 includes the functions ip_input_ours 75, TCP input 76, and UDP input 77, and enqueues data of a received packet in a corresponding socket receive queue 80. Some of the final stages 64-i may make use of the ip_output function 85.

SRP runs only the ether_input stage 42 at interrupt level. SRP runs the end-application stage 64-1 in the context of the respective receiving process 82. SRP runs all other stages in the context of system processes. In operating systems that can guarantee a minimum CPU allocation for each process, SRP obtains CPU guarantees for the latter system processes.

NSS 50 utilizes a multi-stage early demultiplex (MED) function. The MED function returns a pointer to the protocol control block (PCB) of the next stage to which a packet should be submitted, based on current stage and packet header. MED caches the PCB pointer in a field in the packet's first buffer, so that, e.g., TCP input 76 and UDP input 77 do not have to again look up the packet's PCB. Each PCB points to a socket, which in turn points to an unprocessed input queue (UIQ), to an input function, and to a list of owner processes, which are the processes that have the socket open. In order to reduce demultiplexing latency, MED optimistically assumes a common case in which the packet header has appropriate length and version, is contiguous in the first buffer, and has a correct checksum. Stages can invoke an early demultiplex verifier (EDV) function, to verify MED's assumptions. The EDV caches this verification in a flag in the packet's first buffer.

In the illustrative embodiment of FIG. 3, sockets with UIQs 54-1, 54-2 and 54-3 are associated with the preliminary stages 44-1, 44-2 and 44-3, respectively, and sockets with UIQs 74-1, 74-2, 74-3, 74-4, 74-5, 74-6, 74-7 and 74-8 are associated with the final stages 64-1, 64-2, 64-3, 64-4, 64-5, 64-6, 64-7 and 64-8, respectively.

NSS 50 invokes MED and determines the socket and UIQ pointed by the returned PCB. If the total amount of buffering used for the packet plus the socket's UIQ and receive queue exceeds the socket's receive buffer limit, NSS 50 drops the packet; otherwise, NSS 50 enqueues the packet in the UIQ. Receive buffer limits can be set using, e.g., the setsockopt system call in a BSD-based operating system. If the packet is enqueued, and there are processes waiting for UIQ to be non-empty, NSS wakes up those processes; otherwise, NSS sends the SIGUIQ signal to the socket's owner processes. If all owner processes are sleeping non-interruptibly, the SIGUIQ signal delivery will be delayed until the first owner process is woken up. However, because processes generally only sleep non-interruptibly while waiting for a short-term event, e.g., a disk event, the resulting SIGUIQ delay can be expected not to exceed other scheduling delays also typically present in a multitasking environment.

The above-noted SIGUIQ signal in the illustrative embodiment of FIG. 3 is a signal whose default action is to dequeue packets from the UIQ of the process's sockets and submit each packet to the respective socket's input function. However, in accordance with the invention, any process can catch, block, or ignore SIGUIQ signals and, e.g., defer protocol processing of received packets until a subsequent receive call.

As shown in FIG. 3, on receive calls, the receiving process 82 first dequeues any unprocessed packets from the socket's UIQ and submits those packets to the socket's input function. In the case of TCP or UDP sockets, the input function is ip_input_ours 75, which may be a simplified version of the conventional FreeBSD ip_input routine 15 of FIG. 1. The function ip_input_ours 75 calls tcp_input 76 or udp_input 77, which may be modified versions of the corresponding FreeBSD functions 22-1 and 22-2 of FIG. 1. The tcp_input 76 or udp_input 77 functions enqueue the packet in the socket's receive queue 80. The above-noted simplification and modifications in the conventional FreeBSD ip_input, tcp_input, and udp_input functions replace the original demultiplexing operations by cheaper verifications of the previously-described MED optimistic demultiplexing. The receiving process 82 then checks the socket's receive queue 80. If the queue 80 is empty, the receiving process 82 sleeps; otherwise, the receiving process dequeues the data and copies it out to application buffers in a conventional manner.

Because SRP checks buffering limits before protocol processing and processes protocols in the context of the receiving processes, SRP avoids the previously-described receive livelock problem, charges protocol processing to the correct processes, and allows the operating system to enforce and honor QoS guarantees. The above-described default SIGUIQ signal handler makes protocol processing asynchronous, accommodating those TCP applications for which synchronous protocol processing would be inappropriate. As previously noted, any application can, however, catch, block, or ignore SIGUIQ and make protocol processing synchronous. Applications may exploit this flexibility, e.g., to control how much CPU time they spend on protocol processing, to prevent being interrupted while they are processing some critical event, or to perform protocol processing only immediately before they need the received data, which may improve data cache locality.

Figure 4:
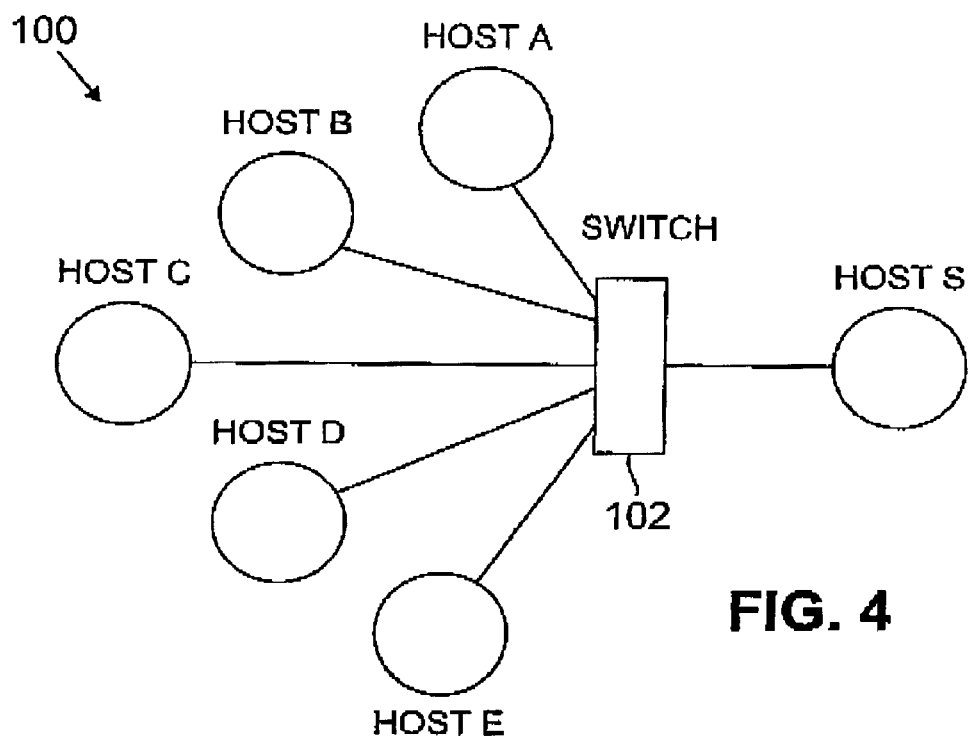
FIG. 4 shows an example of a computer network in which the invention may be used.

FIG. 4 shows an exemplary computer network 100 in which the invention may be implemented. The network 100 includes hosts A, B, C, D, E and S, each connected to a switch 102 as shown. Each of the hosts A, B, C, D, E may represent one or more client computers, and the host node S may represent one or more server computers. The switch 102 may represent an Ethernet or other local area network, a metropolitan area network, a wide area network, a global data communications network such as the Internet, a private "intranet" or "extranet" network, as well as portions or combinations of these and other data communication media.

Figure 5:
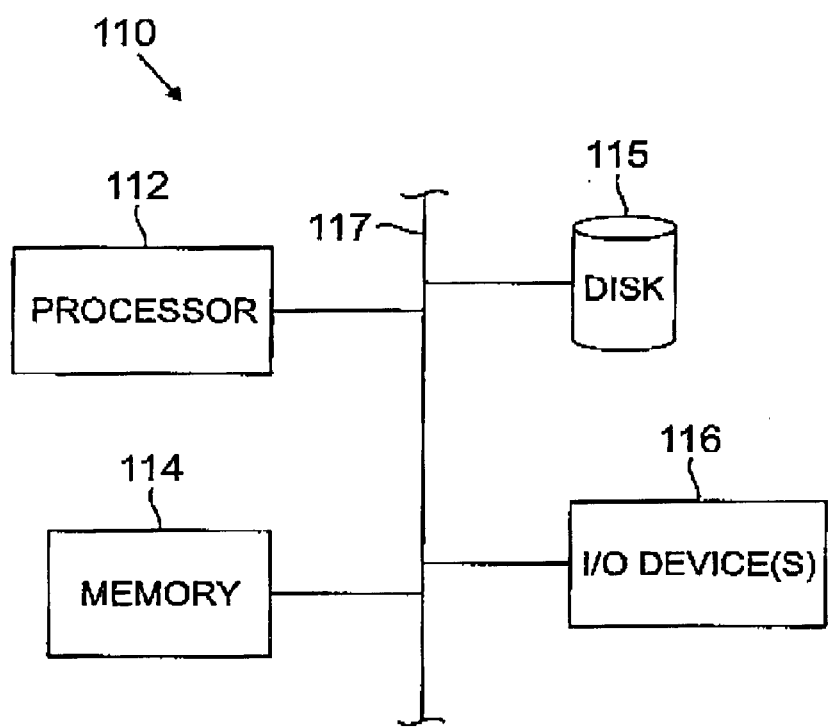
FIG. 5 shows a more detailed view of one of the hosts in the network of FIG. 4.

FIG. 5 shows a more detailed view of a computer 110 that may correspond to a given one of the hosts in the computer network of FIG. 4. The computer 110 includes a processor 112, a memory 114, a disk-based storage device 115, and one or more input/output (I/O) devices 116, and may represent, e.g., a desktop or portable personal computer (PC), a palmtop computer, a personal digital assistant (PDA), a micro or mainframe computer, a workstation, etc. The above-noted elements of the computer 110 communicate over a communication medium 117 which may be implemented as, e.g., a bus, a network, a set of interconnections, as well as portions or combinations of these and other media. The processor 112 may be implemented as a CPU, a microprocessor, an application-specific integrated circuit (ASIC) or other digital data processor, as well as various portions or combinations thereof. The memory 114 is typically an electronic memory, such as a random access memory (RAM) associated with the processor 112. The disk-based storage device 115 may be an external magnetic or optical disk memory, a magnetic tape memory, or other suitable data storage device.

The illustrative embodiment of the invention as described in conjunction with FIG. 3 has been implemented in a computer operating system referred to as Eclipse/BSD, a derivative of FreeBSD that provides hierarchical proportional sharing of system resources such as CPU, memory, and disk and network bandwidth. The Eclipse/BSD operating system is described in greater detail in U.S. patent application Ser. No. 09/450,035 of John Bruno et al., entitled "Methods and Apparatus for Ensuring Quality of Service in an Operating System," and filed concurrently herewith.

Figure 6:
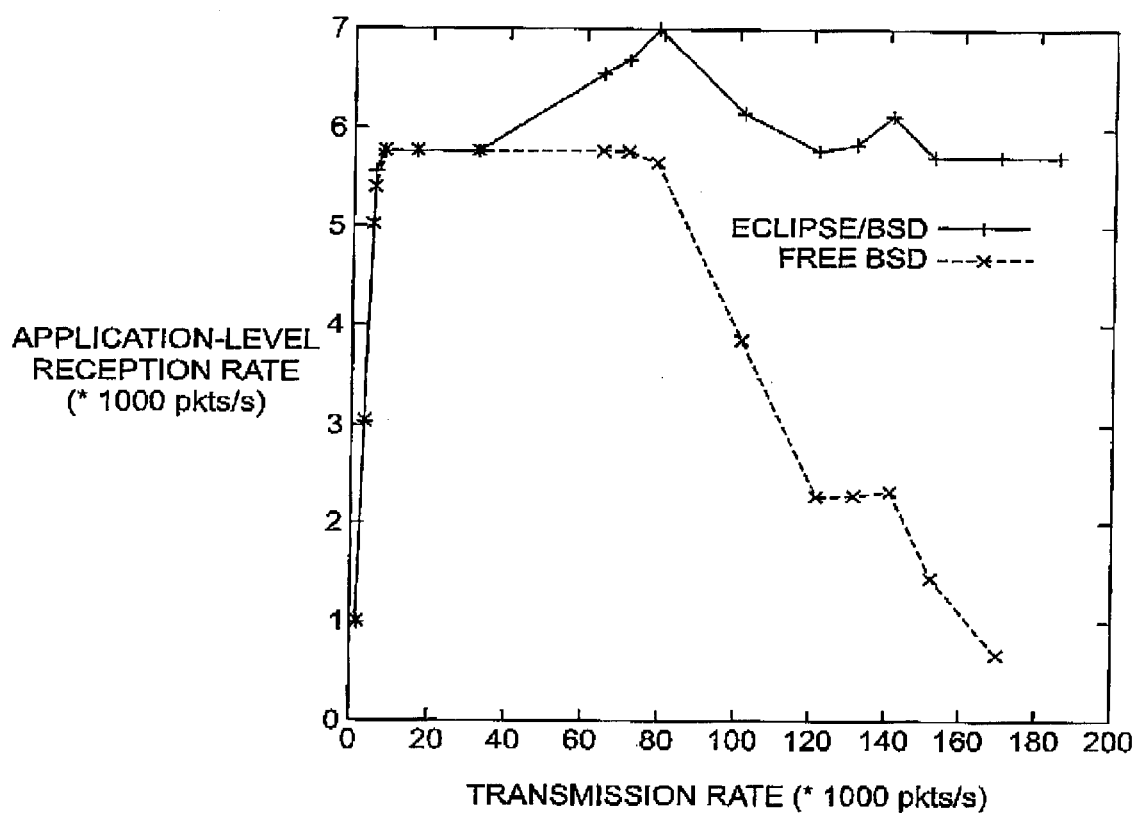
FIGS. 6, 7 and 8 show experimental results illustrating the performance advantages provided by SRP.
Figures 7, 8:
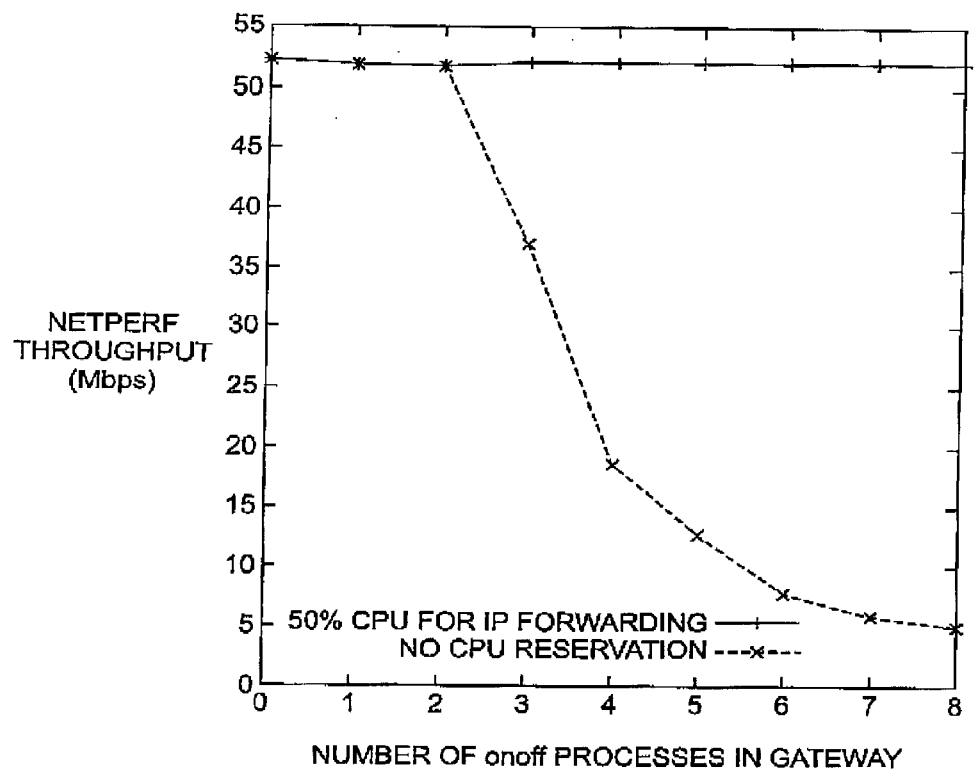

FIGS. 6, 7 and 8 show the results of experiments performed on the illustrative embodiment of SRP, as implemented in the above-noted Eclipse/BSD operating system, in computer systems of the type described in conjunction with FIGS. 4 and 5.

Figure 1:
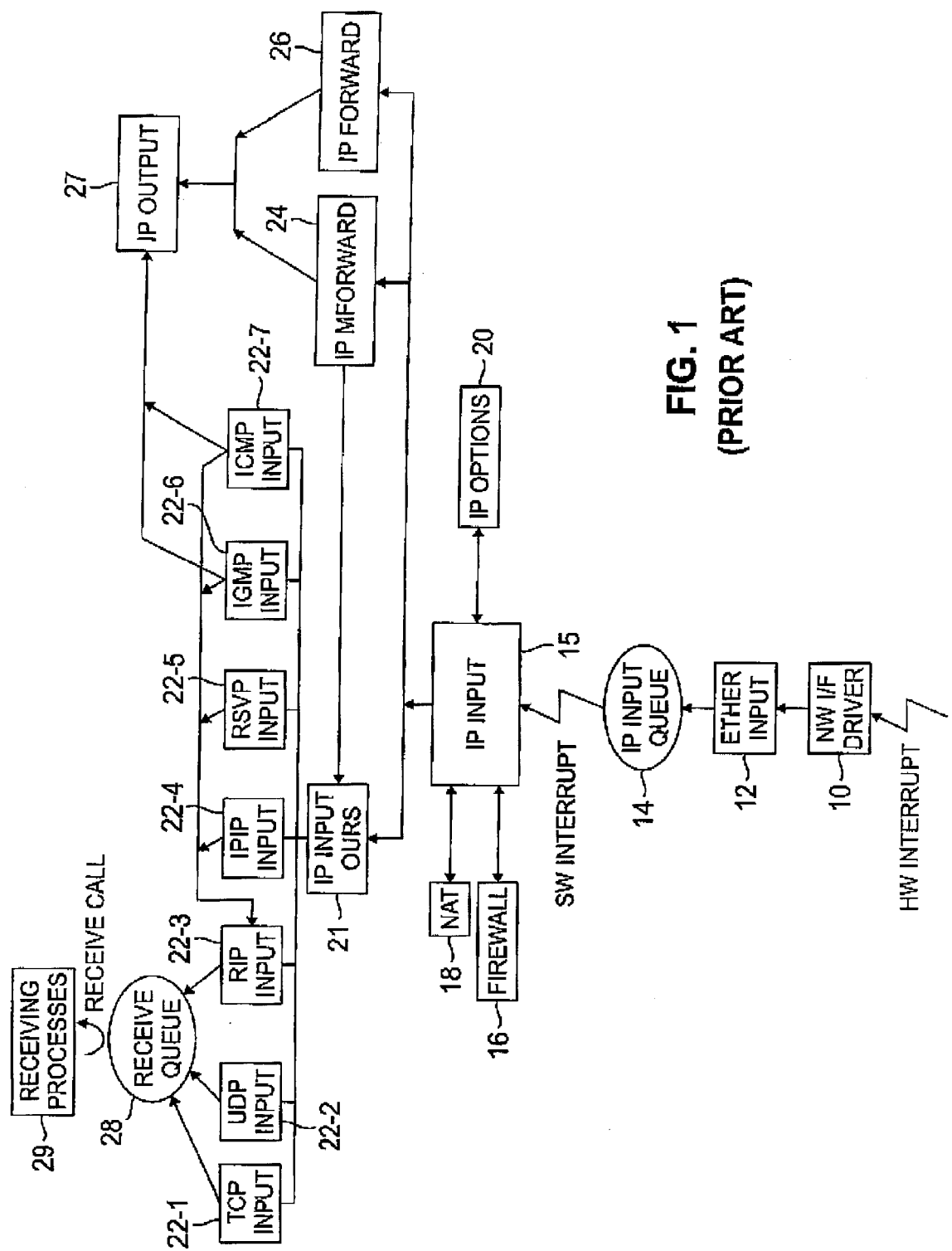
FIG. 1 illustrates protocol processing of received packets in accordance with a BSD approach utilized in certain conventional operating systems.

The first of these experiments was performed to demonstrate that SRP avoids the previously-described receive livelock problem of the BSD approach illustrated in FIG. 1. In this first experiment, a sender application on host S of FIG. 4 sent 10-byte UDP packets at a fixed rate to a receiver application on host A. Host S was implemented as a Pentium Pro PC running the conventional FreeBSD operating system, while host A was implemented as a PC running either FreeBSD or the above-noted Eclipse/BSD on a 266 MHz Pentium Pro CPU with 64 MB RAM. On Eclipse/BSD, the receiver application used SRP's default SIGUIQ handler. Switch 102 connecting hosts S and A was implemented as a Fast Ethernet at 100 Mbps. There was no other load on the hosts or network. The application-level reception rate was measured while varying the transmission rate, and averaged over five runs. The results are plotted in FIG. 6.

FIG. 6 shows that, for both the FreeBSD and Eclipse/BSD operating systems, essentially all packets were received up to a transmission rate of about 5600 packets per second. Above this transmission rate, the reception rate of the conventional FreeBSD operating system is drastically reduced as a result of the receive livelock problem. However, the reception rate of the Eclipse/BSD operating system with SRP reaches a plateau and remains substantially at that level as the transmission rate increases. It is therefore apparent from FIG. 6 that the SRP of the present invention avoids the receive livelock problem.

A second experiment was performed to demonstrate that proportional-share scheduling is desirable in systems that combine gateway and host functionality. Proportional-share scheduling is supported by SRP, but not by the BSD or LRP approaches. In this experiment, a conventional netperf utility was used to measure TCP throughput between hosts A and B on two separate Fast Ethernets connected via a gateway G. Gateway G was implemented as a 266 MHz Pentium II PC with 64 MB RAM and running the Eclipse/BSD operating system with SRP, while host A was implemented as a 400 MHz Pentium II PC with 64 MB RAM and running a conventional Linux operating system, and host B was implemented as a 133 MHz Pentium PC with 32 MB RAM and running the conventional FreeBSD operating system. In addition to IP forwarding, the gateway G ran a variable number of instances of an application called onoff. After each time an onoff process runs for 11 ms, it sleeps for 5 ms. The IP forwarding process ran either with a 50% CPU reservation or with no reservation. The onoff processes ran with no CPU reservation. There was no other load on the hosts or network. The results are plotted in FIG. 7.

FIG. 7 shows that, without a CPU reservation for IP forwarding, applications running on the gateway G, e.g. onoff instances, can drastically reduce TCP throughput. However, an appropriate CPU reservation isolates IP forwarding performance from the other application loads on the gateway.

A third experiment was performed to demonstrate that SRP gives applications control over protocol scheduling and that certain applications can use such control to improve their performance. In this experiment, a client application on host C continuously executed transactions each consisting of sending requests with 512 KB of random integer data to a server application on host S, and then receiving the server's reply of a few bytes. Host C was implemented as a 300 MHz Pentium II PC with 64 MB RAM and running FreeBSD, while host S was implemented as a 266 MHz Pentium II PC with 32 MB RAM and running Eclipse/BSD with SRP. The switch 102 connecting the hosts C and S was implemented as a Fast Ethernet at 100 Mbps. Client and server applications communicated over a TCP connection between sockets with 512 KB send and receive buffers. Hosts and network were otherwise unloaded.

The server application in this experiment processed requests using one of the following three algorithms: (1)

compute five averages of the request data; (2) view the request data as two sets of four 64 KB vectors and compute their 16 internal products; or (3) select the nth largest number among the request data using a partition routine as described in T. Cormen et al., "Introduction to Algorithms," MIT Press, Cambridge, Mass., 1990. While processing these algorithms, the server application either used SRP's default SIGUIQ signal handler or ignored the SIGUIQ signal. The internal cycle counter of the CPU was used to measure, in the server application, the time interval necessary for sending the reply to the previous request, computing the current request, and receiving the next request. The averages and standard deviations of ten runs are shown in the table of FIG. 8. The table shows that the server application runs up to 13% faster when it ignores SIGUIQ and makes protocol processing synchronous. This improvement is due to better data cache locality. In contrast, the BSD and LRP approaches always process received TCP packets asynchronously and therefore do not allow a similar optimization.

Figure 2:
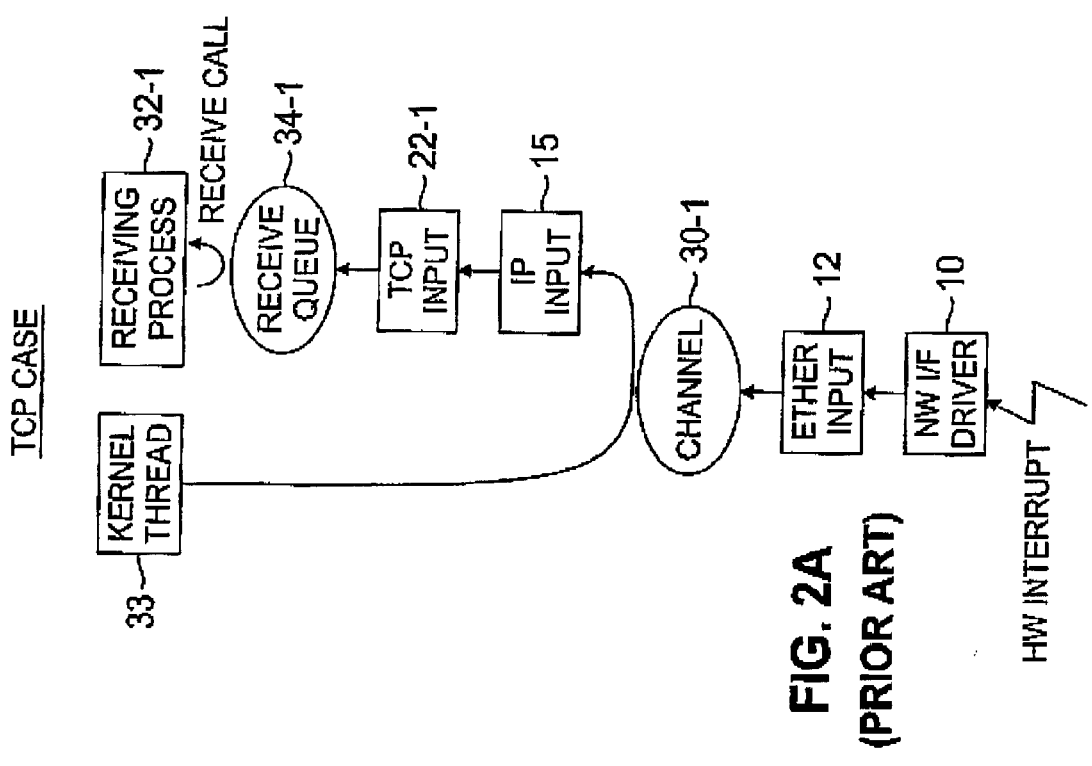
FIGS. 2A and 2B illustrate conventional processing of TCP and UDP packets, respectively, in accordance with a lazy receiver processing (LRP) approach.

The above-described experiments show that, like the LRP approach illustrated in FIGS. 2A and 2B, SRP in accordance with the present invention avoids the receive livelock problem associated with the BSD approach. However, SRP has the additional advantages over LRP of being easily portable to systems without kernel threads, such as FreeBSD, supporting proportional-share scheduling and both host and gateway protocol functionality, and giving applications control over protocol scheduling.

It should be emphasized that the exemplary techniques described herein are intended to illustrate the operation of the invention, and therefore should not be construed as limiting the invention to any particular embodiment or group of embodiments. For example, although illustrated herein using a BSD-based operating system, the techniques of the invention can be used to provide similar improvements in other types of operating systems. These and numerous other alternative embodiments within the scope of the following claims will therefore be apparent to those skilled in the art.

What is claimed is:

1. A method of processing a received packet in an operating system using a plurality of protocol processing stages, each of at least a subset of the stages being configured to process the packet in accordance with a corresponding protocol, the method comprising the steps of:

determining at least one of the processing stages which is required for protocol processing of the received packet; and generating a signal to be sent from a sequencing function to the at least one required processing stage, wherein the signal triggers a default action corresponding to performance of the required protocol processing by that processing stage, and further wherein the default action is overridable by that processing stage.

2. The method of claim 1 wherein each of the processing stages may be allocated a designated minimum share of a particular system resource.

3. The method of claim 1 wherein the plurality of protocol processing stages includes at least one preliminary stage and at least one final stage.

4. The method of claim 3 wherein the sequencing function comprises a next stage submit (NSS) function that receives inputs from each of at least a subset of the preliminary stages and delivers outputs to each of at least a subset of the preliminary stages and each of at least a subset of the final stages.

5. The method of claim 3 wherein the at least one preliminary stage is configured to transfer the received packet to the at least one final stage via the sequencing function.

6. The method of claim 3 wherein the at least one preliminary stage includes one or more of a network interface input stage, a firewall stage, a network address translation stage, and an Internet protocol (IP) options processing stage.

7. The method of claim 3 wherein the at least one final stage includes protocol processing capability sufficient to provide a final disposition of the received packet.

8. The method of claim 3 wherein the at least one final stage includes one or more of an end-application stage, a raw IP (RIP) stage, an IP in IP tunneling (IPIP) stage, a resource reservation protocol (RSVP) stage, an Internet group management protocol (IGMP) stage, an Internet control message protocol (ICMP) stage, an IP multicast stage, and an IP forwarding stage.

9. The method of claim 8 wherein the end-application stage includes an IP input routine, a transmission control protocol (TCP) input routine and a user datagram protocol (UDP) input routine.

10. The method of claim 1 wherein the default action is overridden by the at least one required processing stage by that stage delaying the protocol processing until execution of a subsequent receive call.

11. The method of claim 1 wherein each of the protocol processing stages is associated with one or more sockets.

12. The method of claim 11 wherein a one-to-one association exists between the one or more sockets and corresponding protocol control blocks (PCBs) of at least a subset of the protocol processing stages.

13. The method of claim 11 wherein the sequencing function utilizes a multi-stage early demultiplex (MED) function to determine the socket to which a packet is destined, based on the stage that is currently processing the packet and on information contained in the packet.

14. The method of claim 11 wherein each socket is associated with (1) the input function of a protocol processing stage, (2) an unprocessed input queue (UIQ) containing packets destined to the given socket but not yet processed by that socket's input function, and (3) a list of owner processes, which run on the operating system and expect input from the socket.

15. The method of claim 11 wherein the sequencing function drops a packet if the amount of buffering required for the packet plus the amount of input buffering already used by the packet's destination socket exceeds a designated limit associated with the destination socket.

16. An apparatus for processing a received packet in an operating system which includes a plurality of protocol processing stages, each of at least a subset of the stages being configured to process the packet in accordance with a corresponding protocol, the apparatus comprising:

a processor; and a memory coupled to the processor;

the processor configured to support at least a portion of the operating system, the processor determining at least one of the processing stages which is required for protocol processing of the received packet, and generating a signal to be sent from a sequencing function to the at least one required processing stage, wherein the signal triggers a default action corresponding to performance of the required protocol processing by that processing stage, and further wherein the default action is overridable by that processing stage.

17. An article of manufacture comprising a machine-readable medium for storing one or more programs for processing a received packet in an operating system which includes a plurality of protocol processing stages, each of at least a subset of the stages being configured to process the packet in accordance with a corresponding protocol, wherein the one or more programs when executed implement the steps of:

determining at least one of the processing stages which is required for protocol processing of the received packet; and generating a signal to be sent from a sequencing function to the at least one required processing stage, wherein the signal triggers a default action corresponding to performance of the required protocol processing by that processing stage, and further wherein the default action is overridable by that processing stage.

* * * * *